April 21, 1964 P. J. HARVEY ETAL 3,130,109
ARTIFICIAL PARSLEY GARLAND
Filed Sept. 21, 1961
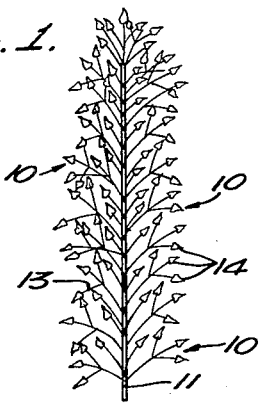
FIG. 1.
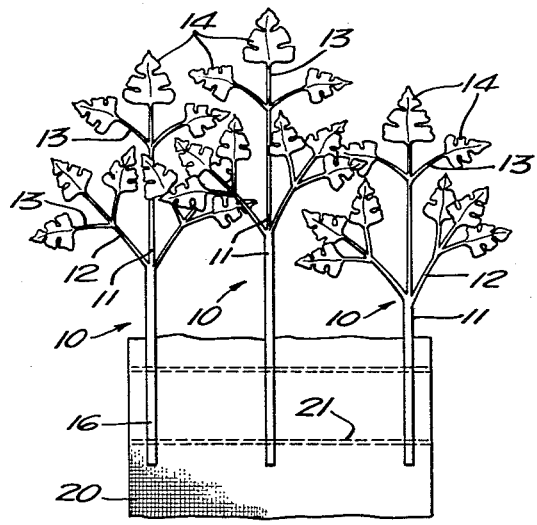
FIG. 6.
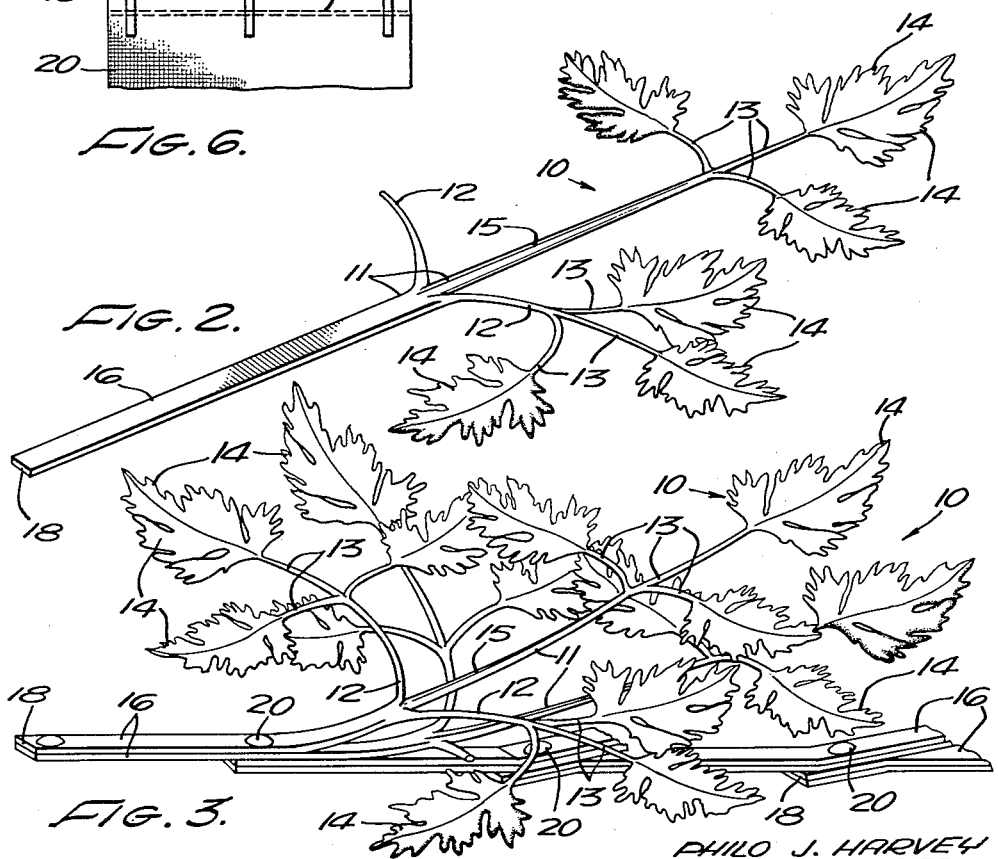
FIG. 2.
FIG. 3.
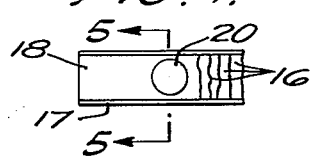
FIG. 4.
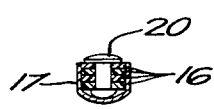
FIG. 5.
PHILO J. HARVEY
NORVIN A. REED
EDWIN S. WRIGHT
INVENTORS
BY
ATTORNEY ent Office
3,130,109
Patented Apr. 21, 1964

3,130,109
ARTIFICIAL PARSLEY GARLAND
Philo J. Harvey, Los Angeles, Nervin A. Reed, North Hollywood, and Edwin S. Wright, Los Angeles, Calif., assignors to Parsfern, Inc.
Filed Sept. 21, 1961, Ser. No. 139,648
4 Claims. (Cl. 161—25)

This invention relates to decorative articles and more especially to artificial floral arrangements, particularly garlands.

A recent development in the decorative arts has been the creation of floral arrangements using artificial floral constituents. As used in the present disclosure the word "floral" is defined as referring to, but not limited to flowers, leaves, buds, stems and branches, or any other component parts of plant life. A wide variety of artificial flowers and plants have heretofore been developed, mainly as individual units, and arranged in bunches or sprays generally similar to the usual corresponding live or real counterparts.

A floral display that is well known and widely used is that of parsley, individual sprigs of which are very generally used on dinner plates in association with the food or articles which are served thereon. Also, clusters or a plurality of sprigs of parsley are commonly used in stores selling fruits, vegetables and meats and the like and placed on or adjacent to parts or portions of these items. In connection with the sale of such articles a need has been felt for a more suitable and practical type of spray or garland simulating parsley or a comparable plant for use in connection with the display of food articles generally. The present invention has therefore, been developed to provide a novel garland utilizing as components sprigs of artificial parsley and such is the general objective of this invention.

A particular object of the invention is to provide novel improvements in the manufacture of garlands.

Another object of the invention is to provide a unique artificial garland utilizing simulated parsley.

A further object of the invention is an improved method of making garlands and particularly artificial parsley garlands.

Another object of the invention is to provide novel means for securing together the several elements comprising an artificial garland.

Other objects and advantages of the invention will become apparent more fully hereinafter from the following specification, together with the accompanying drawing forming a part thereof.

In the drawing:

FIGURE 1 is a front or face view of a garland made according to this invention.

FIGURE 2 is a perspective view of a leaf unit comprising a constituent part of a garland of this invention.

FIGURE 3 is a perspective view of a portion of the garland shown in FIGURE 1.

FIGURE 4 is a fragmentary top view of a portion of the garland stem shown in FIGURE 3.

FIGURE 5 is a sectional view taken along line 5—5 of FIGURE 4.

Referring in more detail to the drawing, a garland of this invention comprises a plurality of so-called leaf units 10 each having a main stem 11 and in general a plurality of branches 12 each of which may have one or more terminal leaf stems 13 at the outer ends of which are parsley leaves 14.

The leaf units 10 are formed of a suitable thermoplastic and having a green coloring corresponding to the usual shade of green of parsley. Main stem 11 has a somewhat oval shaped cross-section and is formed with a longitudinally extending groove 15 to simulate as closely as possible the main stem of a natural parsley leaf unit. The first step in the formation of a garland is to flatten the ends of the main stems 11 as indicated at 16 by any suitable means, such as a pair of rollers, between which the stems are passed. Other means for applying pressure to the stems may be used to provide a permanent set of the stems in flattened condition. Thus, the parsley when molded from the suitable plastic material of which it is preferably formed is advantageously made with flattened stems suitably perforated or otherwise provided with means for contiguous securement to other stems in appropriate relationship as shown.

The next step in the formation of the garland is to place together pairs of the leaf units 10, one above the other and with their ends 18 coinciding and then placing a second pair of the leaf units upon the first pair thereof in overlying stepped arrangement and securing the two pairs together by suitable securing means, such as rivets 20. Other forms of fasteners such as clamps, wires or the like may be used, however, rivets made of a suitable thermoplastic material have been found to be the most satisfactory type. Successive pairs of leaf units are then added and joined to the others in the same manner to make a garland of any desired length. Also, the leaf units may be assembled together singly instead of in pairs as described, however, when arranged in pairs a bushier arrangement of the leaves is effected, a more attractive garland being the result thereof.

FIGURES 4 and 5 show an adhesive tape strip 17 applied to the sides and bottom of the assembled main stems 11, to effect a stiffening of the garland and prevent undue twisting thereof. The tape may be other than adhesive and can be a plastic tape or strip or the like which can be stitched to the stems of the parsley or snapped by means of apertures or the like provided therein over the underside of the rivets 20.

FIGURE 1 shows a typical garland made according to this invention and adopted for display on a store counter in connection with the sale of food products or if desired, it may be hung up, or draped over or on any article or object.

FIGURE 6 shows an alternative or modified form of garland or unit. In this figure a plurality of leaf units 10 are positioned in a generally side-by-side arrangement on a backing or mounting strip or sheet 20, such as fabric, paper, plastic or otherwise, and suitably secured thereon, as by stitching 21, stapling or equivalent fastening means. The decorative possibilities of such garland displays are virtually unlimited.

It will be understood that the foregoing description is illustrative rather than restrictive of the invention and that changes and modifications may be made without departing from the spirit and scope of the subjoined claims.

What is claimed is:

1. An artificial garland comprising in combination, a plastic molded unit comprising a stem having leaves extending therefrom, said stem having a part thereof having a longitudinally extending groove to simulate the main stem of a natural plant, said stem having a flattened part, a second similar stem having leaves extending therefrom and also having a flattened part, means securing the said flattened parts of the stems together in contiguous overlying relationship, a second similar unit of stems having flattened portions fastened together in contiguous overlying relationship, the said flattened portions of the stems having a permanent set as a result of the flattening, and said stem and leaf units being attached together by having the flattened stems of one attached to the flattened stems of the other in overlying stepped relationship whereby to form a garland having flattened stem portions with a permanent set and extending grooved stem portions and leaves attached thereto.

2. An artificial garland as in claim 1 wherein the said stem portions and leaf units are attached together by rivets.

3. An assembly as in claim 1 comprising a plurality of said individual leaf units positioned in an upright side by side relationship and mounted on a mounting member.

4. An artificial garland comprising in combination, a plastic molded unit comprising a stem having leaves extending therefrom, said stem having a part thereof having a longitudinally extending groove to simulate the main stem of a natural plant, said stem having a flattened part, a second similar stem having leaves extending therefrom and also having a flattened part, means attaching the said flattened part of the stem of one unit to an intermediate part of a flattened stem of another unit in connected relationship, said flattened portions of the stems having a permanent set as a result of the flattening, and at least one additional similar stem having a flattened part attached to an intermediate part of the second stem whereby to form a garland having flattened stem portions with a permanent set and extending grooved stem portions and leaves attached thereto.

References Cited in the file of this patent

UNITED STATES PATENTS

| 2,332,816 | Shaw et al. | Oct. 26, 1943 |
| 2,566,950 | Miller et al. | Sept. 4, 1951 |
| 3,046,685 | Blum | July 31, 1962 |

FOREIGN PATENTS

| 1,141,032 | France | Mar. 11, 1957 |